United States Patent Office 3,488,202
Patented Jan. 6, 1970

3,488,202
LINSEED OIL EMULSION PAINTS
Lambertus H. Princen, Peoria, Ill., assignor to the United States of America as represented by the Secretary of Agriculture
No Drawing. Filed May 18, 1967, Ser. No. 641,421
Int. Cl. C09d 5/00, 5/14
U.S. Cl. 106—15                              2 Claims

ABSTRACT OF THE DISCLOSURE

Brilliantly white, very fast drying, mildew resistant, easily redispersible linseed oil-in-water emulsion exterior paints, dry coatings of which show no damage from 24 hours of water immersion, are obtained by sharply decreasing the prior art 5–12 percent combined concentration of nonionic emulsifiers and anionic dispersants to a level of 0.31–1.14 percent nonionic and in partial replacement therefor, adding a highly synergistic 0.575–1.46 percent (exclusive of the vehicle and based on the entire formulation) of one or a mixture of cationic higher alkyl quaternary ammonium chloride emulsifiers.

---

A non-exclusive, irrevocable, royalty-free license in the invention herein described, throughout the world for all purposes of the United States Government, with the power to grant sublicenses for such purposes, is hereby granted to the Government of the United States of America.

BRIEF SUMMARY OF THE INVENTION

A major disadvantage of the prior art linseed oil emulsion paints, having a previously considered necessary 5–12 percent combined content of nonionic emulsifiers, e.g., polyoxyethylated compounds or polyol esters of saturated fatty acids and anionic dispersing agents, e.g., polyphosphates, or polymeric carboxylates, is the moisture sensitivity of the dry films, thus seriously limiting the water resistance and durability when the paints are subjected to the severe moisture conditions accompanying their use on exterior surfaces. Another disadvantage of the prior art oil-in-water paints is their limited emulsion stability and poor shelf-like, apparently resulting at least in part from an uncountered tendency of the positively charged fungicidal zinc oxide particles to form aggregates with the oppositely charged particles of titanium dioxide pigment and with particles of conventional extenders such as clay and mica to rapidly form a voluminous precipitate that cannot be readily redispersed.

Although cationic quaternary amine emulsifiers might be considered to permit films that would be essentially free of exogenously provided moisture-sensitive ionic sites, their use in emulsion paints has been avoided largely as the result of Wold's teaching (M.S. thesis, North Dakota State University (1960)) that amines seriously inhibit the drying of linseed films and perhaps also because McManis et al., J. Paint Technol. 38:740 (1966), teach that the addition of an amide, amine, or ammonia to drying oil paints increases the yellowing of the paint films.

As is well known, fast drying stable emulsion paint compositions for indoor use are widely available. However, these paints are not constantly exposed to strongly mildewing conditions and can therefore employ the leachable and less effective but much more compatible organic mercurial mildewcides in place of zinc oxide. Furthermore, despite the absence of this limitation, the fact that the paints are sold expressly only for interior use is a clear admission that their highly desired emulsion stability and rapid dry properties have been obtained only through the use of such high concentrations of emulsifiers and dispersants that the paints have no practical resistance to prolonged high humidity or to heavy rains.

Although several emulsion paints that purport to be for outdoor use have recently been introduced, we found that dry films of these paints were severely damaged or disintegrated by 24 hours of water immersion.

The conspicuous deficiencies of the previously proposed mildew resistant linseed oil-in-water emulsion paints have now been largely overcome and a practical, long shelf-life, easily redispersed, nonyellowing, very fast drying retouchable, highly durable linseed oil-in-water emulsion white paint for long lasting exterior use has now been achieved by my invention which comprises the use of an unobviously synergistic emulsifier combination in which I have eliminated the previously considered required anionic dispersants, e.g., carboxylates, sulfates, sulfonates, or phosphates and all but about 0.31–1.14 percent of the prior art concentration of nonionic emulsifier and have added in place, thereof, about 0.575 percent to not substantially above 1.46 percent (active agent exclusive of inert solvent) of at least one or a mixture of two cationic higher alkyl quaternary ammonium halide emulsifiers, the said percentages being with reference to the vehicle-free quaternary compound and being based on the total paint formulation.

DETAILED DESCRIPTION OF THE INVENTION

The extensive displacement of linseed oil-based interior paint by the easy-to-use water dispersed alkyd resin or synthetic latex emulsion paints have evoked extensive but heretofore only partially successful research directed toward the formulation of practical, fast drying, highly moisture resistant, and durable linseed-water emulsion paints for outdoor use that possess the do-it-yourself characteristics of the latex emulsion interior paints as well as the exposure-obligated but heretofore only poorly achieved long lasting high resistance of the dry films to humidity and moisture, coupled with both emulsion stability at the nonalkaline pH that is required for avoidance of leaching and the long term protection against mildew that is obtainable only through the incorporation of zinc oxide.

Princen, Official Digest of Federation of the Society of Paint Technologists 37:766 (1965), has shown that in nonionic-emulsified paints there is a stability-destroying opposite charge interaction of zinc oxide with the other pigments and extenders, i.e., titanium dioxide and the clays and micas, and that while such interactions can be prevented by the addition of inorganic phosphate, the presence of the phosphate ions and their counter ions in the dry films provide hydrophilic sites that seriously lower the film's resistance to water and humidity. Since Vold et al., JAOCS 39:424 (1962), have shown that zinc oxide forms emulsion-impairing and film-harming zinc soaps with anionic emulsifiers, e.g., alkyl or aralkyl sulfates or sulfonates, whereas cationic emulsifiers are tainted, as indicated, with the dry-inhibiting reputation of the amines, the paint industry has compromised, especially in regard to the less demanding strictly synthetic latex emulsion paint formulations for interior use, either by substituting for the zinc oxide a compatible but less effective and gradually leachable organic mercurial fungicide or by stabilizing the zinc oxide by the addition of phosphate. However, neither of the above approaches would be even moderately successful in a strictly outdoor oil-in-water emulsion paint where the organic matrix of the dry film consists essentially of mildew-sensitive linseed oil that not only requires the protection of zinc oxide but that is inherently less hydrophobic than the synthetic rubber latices, especially since the conditions of exposure incident to the intended exterior use are obviously much more severe than those encountered by the indoor types of emulsion paints.

The principal object of this invention is the provision of improved linseed oil-in-water emulsion paint formulations that not only have good shelf stability and redispersibility despite the presence of mildew inhibiting amounts of zinc oxide, but whose films rapidly dry sufficiently for touch-up, i.e., in a matter of minutes or at the most a few hours, and then still rapidly, e.g., overnight, crosslink oxidatively to an extent that provides highly durable resistance to heavy rains and to prolonged periods of high humidity and, strikingly, even to 24 hours of immersion in water and thus have practical value as long wearing, nondarkening white paints for exterior use.

As will be more clearly seen from the specific examples, I have now prepared extended shelf-life and readily redispersable bodied and unbodied linseed oil aqueous emulsion white paint compositions for exterior application through the use of a greatly diminished proportion of nonionic emulsifier in combination with a scarcely larger but highly synergistic proportion of at least one previously eschewed cationic long chain fatty acid-derived quaternary ammonium chloride emulsifier, whereby films of my novel paints exhibit extraordinarily rapid drying characteristics and, most importantly, a greatly increased resistance to water.

In accordance with the above and related objects of my invention, I have now discovered that stable linseed oil emulsion paints, whose films can be retouched in minutes and that in only relatively few more minutes can withstand an unexpected shower and then overnight acquire durable water resistances meeting the practical requirements for outdoor use and containing a strongly mildewcidal proportion of zinc oxide and that have a substantially neutral pH that will not leach the coloration from such woods as red cedar, are obtained when otherwise prior art linseed oil-in-water emulsion paint formulations are prepared using from 0.575 percent but not substantially above 1.46 percent (active agent exclusive of vehicle) of a fatty quaternary ammonium emulsifier in conjunction with an even smaller proportion of a conventional nonionic emulsifier and in the total absence of the previously required phosphates, sulfonates, or other anionic dispersing agents.

The cationic emulsifiers found to be operative in preparing the practical linseed oil emulsion paints of my invention are the alkyl trimethylammonium chloride and dialkyl dimethylammonium chloride salts wherein alkyl and dialkyl are long hydrocarbon chains derived from fatty acids, which emulsifiers are obtainable from Armour Chemical Company, Chicago, Ill., under the registered trademark of "Arquads."

EXAMPLE 1

An aqueous phase was prepared by weighing the following into a 500-ml. wide-mouth jar and then mixing with a Lourdes Volumixer.

|  | Grams |
|---|---|
| (3.9 grams exclusive of vehicle) of "Arquad 2HT–75" (registered trademark of Armour Chemical Co., Chicago, Ill., for an aqueous isopropanol solution of a cationic dialkyl dimethyl ammonium chloride quaternary wherein the alkyl groups are $C_{18}$ and $C_{16}$ in the proportion of 3:1) | 5.2 |
| "Tween 60" (trademark of Atlas Powder Co., Wilmington, Del., for a polyoxyethylene sorbitan monostearate emulsifier) | 2.1 |
| Ethylene glycol | 13.0 |
| Distilled water | 241.0 |
|  | 261.3 |

An oil phase was prepared by mixing 3.3 grams lead naphthenate (24% Pb) and 1.7 grams cobalt naphthenate (6% Co) with 142 grams of nonbodied linseed oil. Then 134 grams of the oil phase was added to the above aqueous phase and the 35-gram mixture was stirred briefly to provide a crude emulsion before being transferred (393 grams) to a stainless steel beaker. Upon the addition of 10 grams of distilled water, the whole was emulsified with the Lourdes Volumixer at 8000 r.p.m. for 30 minutes at 50° C.

After being allowed to cream overnight in a tightly closed 500 ml. glass jar, the resulting lower layer was transferred to a Pyrex mixing bowl and then stirred with a Hamilton Beach double cage mixer while slowly adding 180 grams of $TiO_2$, 90 grams ZnO, and 1.5 grams of hydroxy ethyl cellulose. When the mixture was completely smooth, the creamed upper layer was re-added, and the whole was mixed to provide the final emulsion paint, having a nonleaching pH of 6.9. The paint had a cationic emulsifier content of 0.575 percent (excluding the vehicle thereof).

The finished paint contained the following ingredients in the weight percentages indicated:

|  | Weight percent |
|---|---|
| Linseed oil | 19.1 |
| Titanium dioxide | 26.7 |
| Zinc oxide | 13.3 |
| Cationic emulsifier (0.575 without solvent) | 0.77 |
| Nonionic emulsifier (polyoxyethylene sorbitan monosterate) | 0.31 |
| Ethylene glycol | 1.92 |
| 24% lead and 6% cobalt naphthenates in hydrocarbon solvent (drier solution) | 0.67 |
| Hydroxy ethyl cellulose water | 0.22 |
| Water | 37.0 |

Triplicate films, each having a wet thickness of 5 mils, were painted on 3-inch by 6-inch chemically clean glass plates. The plates were permitted to air dry for respective periods of 15, 20, or 30 minutes before being subjected to the water-impact test of Schwab et al., Official Digest of Federation of Societies for Paint Technology, June (1961), wherein 5200 ml. of water falls in about 1 minute onto the center of the horizontally placed painted plate from a ½-inch orifice located 20 cm. above the partially dry paint surface. The films that had dried for only 15 minutes showed considerable damage from the falling water whereas those that had dried for at least 20 minutes were not damaged or loosened from the plates. Inspection of other film replicates that had been permitted to dry in air for 24 hours before being immersed in water for 24 hours revealed absolutely no damage or loosening of the films. By comparison, films identically prepared with two of the now commercially available linseed oil emulsion paints and subjected to identical air drying and immersion in water in one case showed many small blisters and in the other instance simply disintegrated within only 30 minutes of immersion. Send trail tests as described by Sanderson, Proc. ASTM 26, Part II, 556 (1926), of my paint showed films thereof to have a dry-to-touch time of 75 minutes and a tack-free time of 420 minutes. It will be recalled that the lower priced nonbodied linseed oil not only dries more slowly than bodied linseed oil but also tends to yellow to a much greater extent than the bodied oil and would not be used in high quality white paint formulations. However, where the paint is to be colored so that the yellowing tendency is not important and where a minimum cost is a major consideration, the above formulation may well have commercial interest. Shelf-storage of pint jar specimens of this paint for more than 12 months resulted in little separation of pigments, and the emulsion was very readily redispersed by hand mixing.

EXAMPLE 2

A cationic heat bodied linseed emulsion paint was prepared from the following ingredients in the general manner described in Example 1.

An aqueous phase was prepared from the following components:

| | Grams |
|---|---|
| "Arquad 2HT-75" (2.25 gram active QA salt) | 3.0 |
| "Arquad 18-50" (1.5 gram active QA salt) | 3.0 |
| Nonyl phenoxy poly(ethyleneoxy) ethanol | 4.4 |
| Ethylene glycol | 13.0 |
| Distilled water | 260.0 |

Because of the viscous nature of the bodied linseed oil, the following were heated and mixed on a steam bath to provide the oil phase:

| | Grams |
|---|---|
| M-25 heat-bodied linseed oil | 187.0 |
| Sorbitan trioleate | 5.2 |
| Pb naphthenate | 3.6 |
| Co naphthenate | 1.6 |

165 grams of the oil phase was mixed into the aqueous phase to provide a crude emulsion, 408 grams of which was then transferred to a stainless-steel beaker in which it was stirred at 8000 r.p.m. for ½ hour. Then 389 grams of the emulsion was removed to a suitable transparent jar and allowed to cream overnight, following which the lower layer was transferred to another mixing vessel.

Following further additions of one 2.6 gram portion (vehicle included) of each of the same proprietary cationic quaternary ammonium emulsifier solutions employed in the preparation of the aqueous phase, the following were slowly added to the lower phase while constantly mixing with a double cage mixer:

| | Grams |
|---|---|
| TiO$_2$ | 180 |
| ZnO | 90 |
| Hydroxy ethyl cellulose | 1.5 |

When the above emulsion appeared smooth, the "cream" was added back, and the whole then mixed to a white, highly stable emulsion paint having a pH of 6.8. The active cationic emulsifier content of the formulation was 0.98 percent.

The finished paint contained the following ingredients in the weight percentages indicated:

| | Weight percent |
|---|---|
| Linseed oil | 20.4 |
| Titanium dioxide | 27.0 |
| Zinc oxide | 13.5 |
| Cationic emulsifier (0.98 without solvent) | 1.56 |
| Nonionic emulsifier (sorbitan trioleate plus nonyl phenoxy poly(ethyleneoxy)ethanol) | 1.14 |
| Ethylene glycol | 1.70 |
| 24% lead and 6% cobalt naphthenates in hydrocarbon solvent (drier solution) | 0.57 |
| Hydroxy ethyl cellulose | 0.23 |
| Water | 33.9 |

Films subjected to the same tests used for the films of Example 1 showed that when the films had dried for only 15 minutes, they withstood the cascading effect of 5200 ml. of water without any discernible effect. Likewise, there was no damage from 24 hours of total immersion in water, and the Sanderson sand trail tests showed the dry-to-touch time to be only 4 minutes and the tack-free time to be 40 minutes. The storage stability of the paint emulsion was equivalent to that of Example 1.

EXAMPLE 3

For another paint, the aqueous phase consisted of:

| | Grams |
|---|---|
| 75 percent active dialkyl dimethylammonium Cl emulsifier of Example 1 | 4.2 |
| 50 percent active alkyl trimethylammonium Cl emulsifier of Example 2 | 4.2 |
| Nonyl phenoxy poly(ethyleneoxy) ethanol | 4.1 |
| Ethylene glycol | 12.1 |
| Distilled water | 243 |

The following were blended to provide an oil phase:

| | Grams |
|---|---|
| Sorbitan trioleate | 4.9 |
| M-25 heat-bodied linseed oil | 172 |
| Lead naphthenate | 3.4 |
| Cobalt naphthenate | 1.5 |

After adding 154 grams of the oil phase to the aqueous phase and emulsifying 412 grams of the crude emulsion at 50° C. and 8000 r.p.m. for 30 minutes, 385 grams of the emulsion was allowed to cream overnight. To the isolated bottom layer was again added 3.9 grams (vehicle included) of each of the same quaternary ammonium emulsifiers that were used to prepare the aqueous phase, followed by the addition and high speed blending of 179 grams of TiO$_2$, 89 grams of ZnO, and 1.3 grams of hydroxy ethyl cellulose.

When the above emulsion appeared smooth and homogenous, the "cream" was added back and stirred in to provide a highly stable emulsion having a pH of 6.6. The cationic emulsifier content (active ingredient) of the paint was 1.46 percent.

The finished paint contained the following ingredients in the weight percentages indicated:

| | Weight percent |
|---|---|
| Linseed oil | 20.1 |
| Titanium dioxide | 27.0 |
| Zinc oxide | 13.4 |
| Cationic emulsifier (1.46 without solvent) | 2.34 |
| Nonionic emulsifier (sorbitan trioleate plus nonyl phenoxy poly(ethyleneoxy)ethanol) | 1.14 |
| Ethylene glycol | 1.66 |
| 24% lead and 6% cobalt naphthenates in hydrocarbon solvent (drier solution) | 0.57 |
| Hydroxy ethyl cellulose | 0.20 |
| Water | 33.5 |

Although test panels that were dried for only 20 minutes failed the water-impact test, panels that had dried in air for 30 minutes were completely unaffected by the cascade. Likewise, such panels also passed the 24-hour water immersion test. Sand trail tests of the paint revealed a dry-to-touch time of 15 minutes and a tack-free time of 180 minutes.

I claim:

1. A shelf-stable, white, nonleaching, mildew-resistant, emulsion paint consisting essentially of the following ingredients in the ranges of the percentages by weight indicated:

| | Weight percent |
|---|---|
| Drying oil selected from the group consisting of unmodified linseed oil and heat-bodied linseed oil | 19.1–20.4 |
| Titanium oxide | 26.7–27.0 |
| Zinc oxide | 13.3–13.5 |
| A cationic emulsifier, in isopropanol as a vehicle, selected from the group consisting of an alkyl trimethylammonium chloride and a dialkyl dimethylammonium chloride, and mixtures thereof, and wherein said alkyl and dialkyl groups contain from 16 to 18 carbon atoms (0.575–1.46 exclusive of vehicle) | 0.77–2.34 |
| A nonionic emulsifier selected from the group consisting of poly(oxyethylene) sorbitan monostearate and a substantially equal mixture of sorbitan trioleate and nonyl phenoxy poly(ethyleneoxy)ethanol | 0.31–1.14 |
| Ethylene glycol | 1.66–1.92 |
| 24% lead and 6% cobalt naphthenates in hydro carbon solvent (drier solution) | 0.57–0.67 |
| Hydroxy ethyl cellulose | 0.20–0.23 |
| Water | 33.5–37.0 | said paint being further characterized by the ability of a 5-mil film thereof that had dried in air for 15–30 minutes to show no damage from a 5200 ml. stream of water and also no damage from 24 hours of immersion in water to film that had first been permitted to dry in air for 24 hours, as well as by Sanderson sand trail dry-to-touch time of 4 minutes to 75 minutes and tack-free times of 40 minutes to 420 minutes.

2. In a process for producing a shelf-stable, linseed oil-water emulsion paint that dries very rapidly and contains a mildewcidal 13.3 to 13.5 percent of zinc oxide in addition to 26.7 to 27.0 percent titanium dioxide, 19.1 to 20.4 percent linseed oil, 33.5 to 37.0 percent water, 0.57 to 0.67 percent lead and cobalt naphthenate driers, 1.66 to 1.92 percent ethylene glycol, and 0.20 to 0.23 percent hydroxy ethyl cellulose thickener, all percentages being by weight, and that is characterized by the ability of dry coatings thereof to withstand at least 24 hours of immersion in water without exhibiting loosening of the coating or other visible damage, the improvement comprising formulating the paint with about from 0.31 percent to not more than about 1.14 percent by weight, based on the total formulation, of a nonionic emulsifier, and in combination therewith as the sole additional emulsifying or dispersing material about from 0.575 percent to not substantially exceeding a total of 1.46 percent (active ingredient exclusive of vehicle) by weight, of at least one cationic quaternary ammonium emulsifier selected from the group consisting of an alkyl trimethylammonium chloride and a dialkyl dimethylammonium chloride, and mixtures thereof, and wherein said alkyl and dialkyl groups contain from 16 to 18 carbon atoms.

References Cited
UNITED STATES PATENTS

| 3,047,413 | 7/1962 | Schwab et al. | 106—171 |
| 3,140,191 | 7/1964 | Kubie | 106—254 |

ALLAN LIEBERMAN, Primary Examiner

U.S. Cl. X.R.

106—170, 171, 193, 197, 254